March 24, 1953  G. P. JENNINGS ET AL  2,632,395
HEAT EXCHANGE ASSEMBLY FOR CENTRIFUGAL PUMPS
Filed June 2, 1948  2 SHEETS—SHEET 2
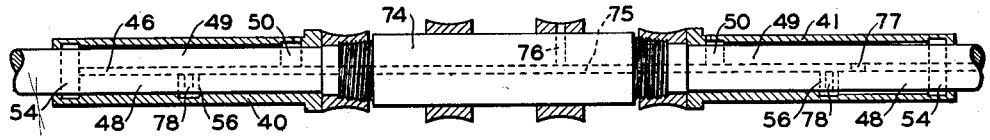
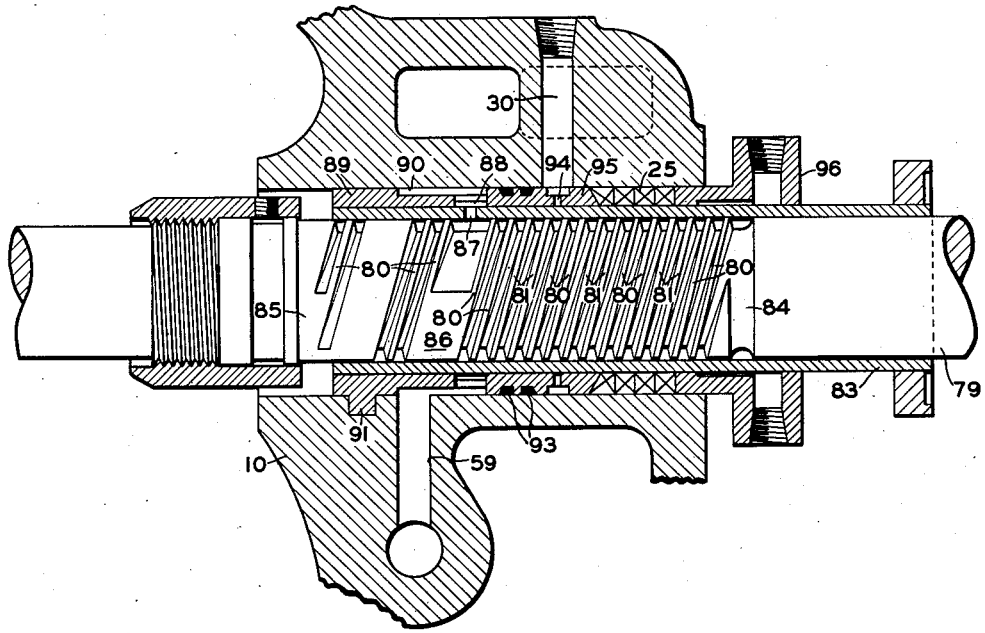
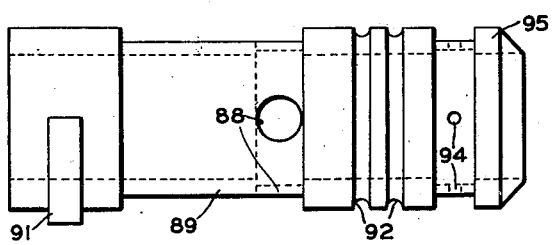
INVENTORS
G.P. JENNINGS
L.P. MEADE
BY *Hudson & Young*
ATTORNEYS Patented Mar. 24, 1953

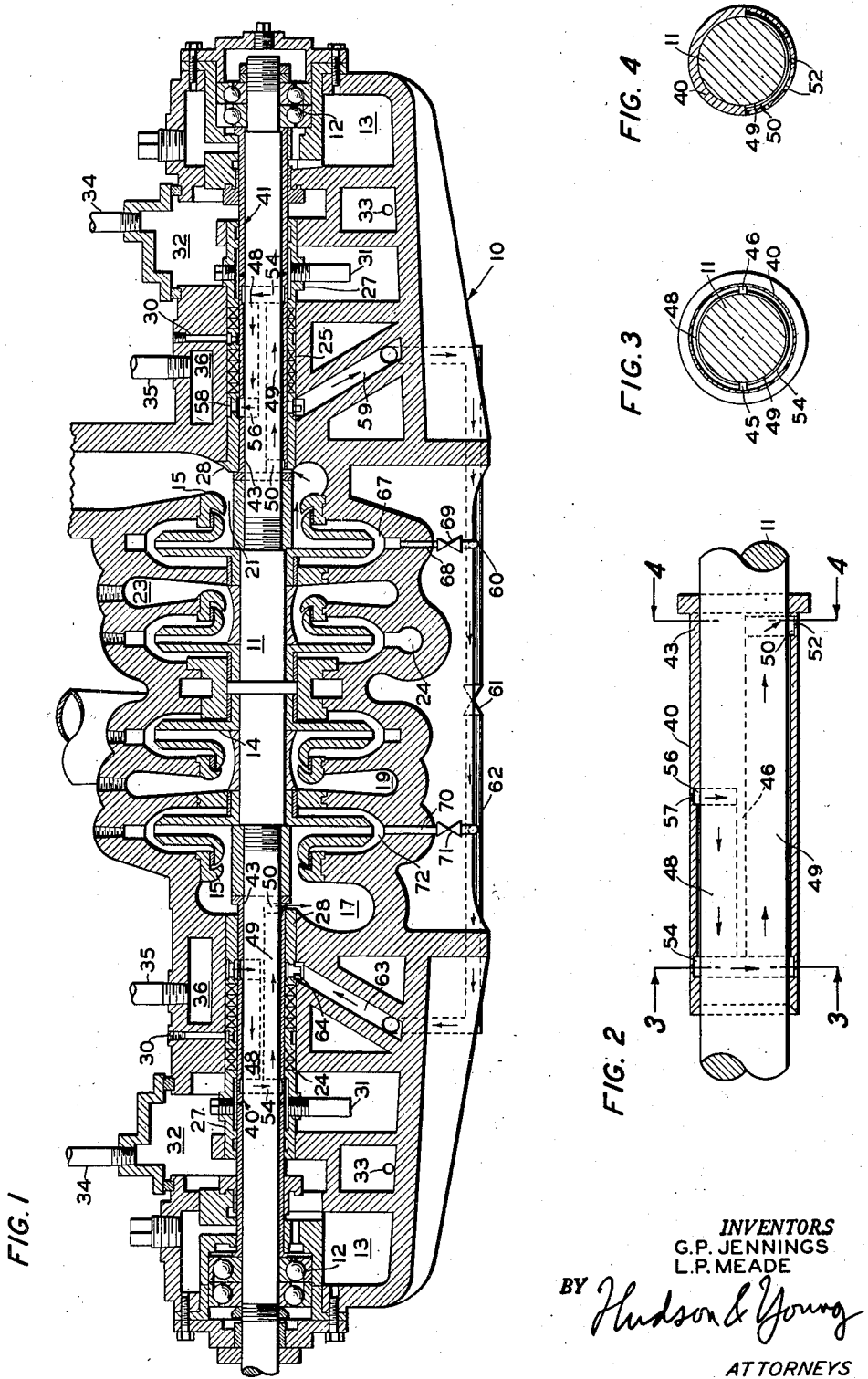

2,632,395

UNITED STATES PATENT OFFICE 2,632,395

HEAT EXCHANGE ASSEMBLY FOR CENTRIFUGAL PUMPS

Gerald P. Jennings and Leonard P. Meade, Bartlesville, Okla., assignors to Phillips Petroleum Company, a corporation of Delaware Application June 2, 1948, Serial No. 30,586

9 Claims. (Cl. 103—108)

This invention relates to centrifugal pumps. In another aspect it relates to a heat exchange assembly for preventing overheating of pump packing.

In centrifugal pumps, packing must be provided around the pump shaft at regions where the shaft enters the pump casing to prevent the escape of the liquid being pumped. In order to properly seal against such leakage, the packing must fit snugly around the shaft. A serious problem arises in connection with this packing in that a considerable amount of heat is generated by friction between the packing and the rotating pump shaft. If this heat is not dissipated, the packing becomes overheated and expands, thereby producing excessive wear on the packing and shaft which, consequently, results in considerable fluid leakage. The resulting uncontrolled leakage spews liquid around the pump and, if the liquid is inflammable, a definite fire hazard is created.

In order to overcome this difficulty in the operation of centrifugal pumps, particularly when pumping several grades of gasoline and oils, it has been both necessary and customary to permit leakage of a relatively small portion of the pump fluid around the shaft through the packing in order to prevent overheating thereof. The gasoline or oil evaporates when released into the atmosphere from the packing gland, and although some of the material is returned to the line, about fifty per cent of the gland leakage is never recovered. The leakage of such liquids through the pump packing not only accounts for a high percentage of loss of material handled through the pump, but also substantially reduces the life of the shaft in the case of material containing abrasives.

It has also been previously proposed to remove the heat produced by friction through circulation of cooling fluid in the pump casing outside the packing, rather than to allow leakage through the packing. This has not proven satisfactory in practical operation since it does not protect the packing. The heat is generated at the region of contact between the packing and the shaft; consequently if such a scheme of heat removal is used, the heat must pass through the entire packing. Since packing material is a poor conductor of heat, the packing soon deteriorates as mentioned above. Still another proposal has involved the injection of a lubricant between the packing and shaft to reduce the friction between these parts. This helps protect the packing to a certain extent but does not provide sufficient cooling so that cooling means mentioned above must be resorted to.

In accordance with the present invention, I overcome the difficulties and shortcomings of the prior art by utilizing a heat transfer process to remove the heat generated by friction between the packing and the pump shaft. The heat transfer process involves the circulation of a cooling medium, which is the fluid being pumped, through passages formed between the shaft and a metal sleeve surrounding the shaft. The cooling medium is obtained from a region of high pressure in the pump and discharged into a region of low pressure. The metal sleeve may be the conventional pump wear sleeve. As a result, the packing may be adjusted, according to any of the conventional packing practices, with positive assurance that the heat transfer process will adequately remove the heat generated by the packing and rotating shaft to cool these parts to a safe temperature, thereby protecting the packing and reducing leakage to a minimum.

It is an object of the invention to provide an improved method of and apparatus for efficiently removing the heat generated between the packing and the pump shaft by circulating a cooling medium through the pump shaft, wherein the fluid being pumped is used as the cooling medium.

It is a further object of the invention to provide a heat exchange system whereby the packing may be adjusted to obtain an efficient seal.

It is a further object of the invention to provide a heat exchange system wherein the packing is not exposed to the cooling medium.

It is still another object of the invention to obtain the cooling medium used in the heat exchange process from a region of high pressure within the pump and discharge the cooling medium into a region of low pressure within the pump, all without the use of auxiliary equipment and without exposing the cooling medium to the atmosphere, with resultant evaporation thereof.

It is still a further object of the invention to provide a centrifugal pump heat exchange apparatus which is simple in construction, reliable in operation, economical to manufacture, and of rugged construction.

Various other objects, advantages and features of the invention will become apparent from the following detailed description taken in conjunction with the accompanying drawings, in which:

Figure 1 is a vertical sectional view of a centrifugal pump embodying the present invention;

Figure 2 is a vertical sectional view, partially in elevation, of a shaft with a sleeve assembly mounted thereon;

Figures 3 and 4 are, respectively, sectional views taken along the lines 3—3 and 4—4 of Figure 2, looking in the direction of the arrows;

Figure 5 is a vertical sectional view, partially in elevation, of a modified shaft construction;

Figure 6 is a vertical sectional view, partially in elevation, of still another modified shaft construction; and Figure 7 is a front elevational view of the packing member shown by Figure 6.

Referring now to the drawings in detail, and particularly to Figure 1, we have shown the heat exchange apparatus of this invention applied to a centrifugal pump having a casing 10 in which a shaft 11 is journalled by bearings 12, the bearings being disposed in chambers 13 for receiving lubricating fluid. The pump has several stages and, accordingly, the casing is shaped to form a series of volute chambers, each of which has an impeller 14 rotatably mounted therein on shaft 11. As those skilled in the art will understand, a labyrinth seal 15 is provided between each impeller 14 and the casing 10.

The operation of the pump is conventional, it being understood that fluid to be pumped enters suction chamber 17 through a suitable conduit, not shown, after which the fluid passes successively through suction chambers 19, 21 and 23, the pressure of the fluid being substantially increased by each stage of the pump, it being understood that the fluid passes through the respective impellers 14 in passing from suction chambers 17 to 19, 19 to 21, etc. From volute chamber 24, the high pressure fluid passes through a conduit, not shown, to the outlet of the pump. It will be apparent that there is a substantial pressure differential between the respective stages of the pump.

In accordance with the invention, this pressure differential is used to circulate a by-pass stream of the fluid in the pump through a shaft-sleeve assembly so that heat exchange occurs between the fluid and the portion of the shaft-sleeve assembly which is adjacent the shaft packing, thereby to prevent overheating of the packing. Two sets of packing rings 24 and 25 are provided for the shaft, one at each side of the impeller system, these packing rings being mounted in enlarged regions of the casing. The packing may be compressed to any desired extent by annular members 27, 28 which are disposed concentrically with respect to the shaft 11. Lubricating material, such as oil or grease, may be supplied to the packings through bores 30, and material leaking through the packing passes through conduits 31 in the respective members 27 to chambers 32, each of which is provided with a drain 33 and a vent 34. Exterior cooling may be provided for the packing 24, 25 by admitting cooling fluid through inlets 35 to chambers 36.

It will be apparent that a considerable amount of heat is produced by frictional engagement of the packings 24, 25 and the shaft 11, when the latter is rotated. Although the cooling chambers 36 carry away a small part of this heat, it will be apparent that such chambers do not provide an efficient heat transfer system for the reason that the heat produced at the joint of the packing and shaft must pass through the packing and a portion of the casing 10 in order to reach cooling chambers 36. As previously discussed, it is undesirable to permit fluid to flow from the impeller chambers 17 or 21 through the packing and into chambers 32 in order to cool the shaft. In accordance with this invention, a portion of the fluid pumped by the impellers 14 is passed through the shaft closely adjacent the region where the frictional engagement between the packing and shaft takes place, which effectively removes the heat generated by said frictional engagement, thereby preventing the rapid deterioration of the pump packing.

To this end, a pair of modified metal wear sleeves 40, 41 are secured to the shaft at the respective opposite ends of the impeller system, these sleeves being secured to the shaft in any suitable manner, such as force fitting. Sleeve 40 has an inner region 43 which extends into suction chamber 17 and the inner region 43 of sleeve 41 extends into the suction chamber 21. Referring now to Figures 2, 3, and 4, the sleeve 40 has a pair of diametrically opposite longitudinal ears 45, 46 which protrude inwardly of the sleeve and tightly engage shaft 11. Accordingly, these ears define a pair of spaced longitudinal passages 48, 49 with the cylindrical portion of the sleeve and these passages are of generally annular cross section. Passage 49 is substantially longer than passage 48 and an annular duct 50 communicates with the inner end of said passage 49. The inner region 43 of the sleeve has perforations 52 formed therein to permit passage of fluid between the inner end of passage 49 and the exterior of the sleeve. An annular channel 54 formed in the sleeve communicates with the outer end of passage 49 and the outer end of passage 48, thereby interconnecting these passages. The inner end of the shorter passage 48 communicates with an annular duct 56 formed in the sleeve 40 and this duct, in turn, communicates with the exterior of the sleeve through perforations 57.

It will be apparent that fluid entering the perforations 57 flows through duct 56 and passage 48 in a longitudinal direction, is reversed at channel 54 and thence flows in a longitudinal direction through passage 49 to the duct 50 and perforations 52. Accordingly, the fluid is in intimate heat exchange relation with the sleeve 40 and the overlying packing 24 so that the heat produced in the latter parts is rapidly carried away by the fluid. Due to the described reversal in direction of the fluid, it is possible to obtain a maximum area for the heat transfer while providing a simple and efficient circulatory flow. The structure of sleeve 41 is similar to that of sleeve 40 and, hence, need not be described in detail.

In the embodiment of the invention shown by Figure 1, a by-pass circulation of fluid is established from suction chamber 21 through the duct 50, passage 49, channel 54, passage 48, and duct 56 of sleeve 41 to a perforated ring 58 in the adjacent member 28. The fluid discharged through ring 58 passes through a bore 59 in the casing, a conduit 60, a valve 61, a conduit 62, and a bore 63 in casing 10 to a perforated ring 64 in the other member 28. From the ring 64, the fluid passes through the passage 48, channel 54, passage 49, and duct 50 of sleeve 40 to the first stage suction chamber 17 of the pump. An intimate heat exchange is effected between the circulating fluid and the sleeves 40, 41, thereby effectively preventing overheating of the packing. It will be noted that no separate pump is required for the heat exchange system since the energy for circulating the fluid is provided by the main pump impellers 14. Further, there is no necessity of providing an auxiliary heat exchange fluid since a by-pass heat stream of the fluid being pumped is used for the heat exchange system, and this heat exchange fluid is not wasted, but is recirculated through the pump. When the described heat exchange apparatus is used, the packing 24, 25 may be sufficiently tight to prevent leakage of any substantial amount of fluid through the packing, thereby preventing loss of the pumped fluid through leakage and greatly minimizing hazards arising from evaporation of volatile or inflammable fluids.

In regard to the sleeves 40 and 41, it will be noted that sleeve 40 is connected to a relatively high pressure stage of the pump through sleeve 41 and to a relatively low pressure stage of the pump through duct 50. Sleeve 41 is connected to a relatively high pressure stage of the pump through duct 50 and to a relatively low pressure stage of the pump through sleeve 40. In order to adapt the apparatus to fluids of different types, it is desirable to provide for connecting sleeve 40 directly to a high pressure stage of the pump rather than making this connection through sleeve 41 and to provide for a direct connection between sleeve 41 and a low pressure stage of the pump, rather than making this connection through sleeve 40. To this end, the volute chamber 67 is connected by a line 68 and a valve 69 to conduit 60 while conduit 62 is connected by a line 70 and a valve 71 to volute chamber 72. When valve 61 is closed and valves 69, 71 are opened, an independent circulation of fluid is provided for sleeve 41 through line 68, conduit 60, passages 48, 49 and annular duct 50 to suction chamber 21, the direction of flow being opposite to that indicated by the arrows. Similarly, an independent flow is established through sleeve 40, the fluid passing through line 70 from the volute chamber 72, through conduit 62, passage 48, passage 49, and annular duct 50 to the low pressure or suction chamber 17. The provision of this alternate flow is very desirable when different types of liquid are to be pumped by the impellers 14.

A modified form of shaft construction is shown by Figure 5, in which parts similar to those already described are indicated by like reference characters. In this modification, a shaft 74 is provided with an axial bore 75 and this bore is connected by a radial passage 76 to a high pressure stage of the pump, the bore 75 having a plug 77 inserted therein near its open end. Two sleeves 40 and 41, which are similar to those already described, are mounted on the shaft and a radial passage 78 is provided connecting the annular duct 56 of each sleeve to the axial bore 75. When this assembly is substituted for the shaft 11 and sleeves 40, 41 of Figure 1, fluid from a high pressure stage of the pump flows through axial passage 76, bore 75, the radial passage 78, duct 56, passage 48, passage 49, and duct 50 of sleeve 41 to the suction chamber 21. A similar circulation is established through passage 76, bore 75, the duct 56, passage 48, passage 49, and duct 50 of sleeve 40 to the intake suction chamber 17. This modification has the advantage that no external connections are required to the sleeves, and the sleeve-shaft assembly may be added to existing centrifugal pumps without the necessity of making any alterations in the structure of the casing or impeller chambers. Also, in this modification, the pressure of the fluid in sleeve 40 is higher than that in sleeve 41. This results from the fact that the passages in sleeve 40 are connected to the lowest pressure stage of the pump while the passages in sleeve 41 are connected to an intermediate stage of the pump. This is desirable where there is unequal friction in the two packings and it is desired to provide a faster transfer of heat from one packing than from the other packing.

Another important modification of the invention is shown by Figures 6 and 7, in which a shaft 79 is provided with two separate sets of helical threads 80, 81 adjacent each of the packings 24 and 25, Figure 1. It is understood that whereas a quadruple thread is preferred, the threads may be double, sextuple, or octuple, so long as two separate sets thereof define channels similar to the channels defined by threads 80 and 81. A wear sleeve 83 is mounted on the shaft, as by force fitting, and this sleeve defines, together with the threads, two independent sets of channels extending helically from one end to the other of the packing 25. An annular groove 84 formed in the shaft interconnects one end of these channels, while the other end of the channels defined by threads 80 terminate adjacent the region 85 of the shaft so that said channels communicate with the suction chamber 21. The channels defined by threads 81 terminate at an outlet region 86 which communicates, through passages 87 in sleeve 83 and openings 88 in a packing compression member 89, with an annular port 90 connected to the bore 59. The member 89 is keyed to the casing at 91 and is provided with annular channels 92 for receiving gaskets 93. The member 89 is also provided with a passage 94 which communicates with passage 30 to admit lubricating fluid to the packing. A head portion 95 of member 89 engages one end of the packing 25, the other end of which is engaged by a member 96 in order to compress the packing to any desired extent and thereby substantially eliminate leakage through the packing. It will be understood that a similar unit is provided for the packing 24, the channels defined by the screw threads communicating, respectively, with annular port 64 and the intake chamber 17.

In the heat exchange unit of Figure 6, fluid from suction chamber 21, Figure 1, flows through the channels defined by threads 80 in a helical path to the annular groove 84. Thereupon, the direction of fluid flow is reversed and the fluid returns through the channels defined by threads 81 to the region 86 from which it flows through openings 87 and 88 to bore 59 and conduit 60. In the case of the similar unit cooperating with packing 24, fluid flows from a high pressure stage of the pump through bore 63, port 90, openings 88, 87, the channels defined by threads 81, the annular groove 84, the channels defined by threads 80, and the outlet region 85 to the suction chamber 17 of the pump. It will be apparent that the fluid flows longitudinally from one end of the threaded portion to the other, and then returns, although this longitudinal movement occurs in a helical path. This construction has been found to provide heat exchange of outstanding efficiency between the fluid and the sleeve 83, thereby effectively preventing overheating of the packing. This may be due to the fact that the fluid travels throughout a longer path than is the case with any of the previously described modifications. In addition, the threaded construction is easy to provide on the shaft and little modification of other parts of the apparatus is required in order to adapt this modification to existing pumps. The embodiment of Figures 6 and 7, of course, offers the advantages of the other two forms of the invention in that the fluid to be pumped is utilized as the heat exchange fluid, the power to operate the heat exchange system is furnished by the main pump, and no fluid is wasted or lost since the fluid used for heat exchange purposes is recycled to the system. Finally, the present embodiment permits the packing 25 to be tightened sufficiently to prevent leakage therethrough thereby minimizing waste and hazards resulting from volatilization of flammable fluids.

Although the drawings show pumps with two stuffing boxes, it is realized many single or multiple stage pumps have only one stuffing box. Also, in some cases, only one set of helical threads is required to provide adequate cooling of the bushing.

While the invention has been described in connection with present, preferred embodiments thereof, it is to be understood that this description is illustrative only and is not intended to limit the invention, the scope of which is defined by the appended claims.

Having described our invention, we claim:

1. A centrifugal pump comprising, in combination, a casing having a series of volute chambers formed therein, an impeller in each chamber, a shaft journalled in said casing and extending through each of said chambers to drive said impellers, said casing being constructed and arranged to accommodate a packing for said shaft at each end of the impeller chambers, a pair of sleeve members fixed to said shaft and extending through the respective packings to opposite sides of said series of impeller chambers, each sleeve defining with the shaft a pair of spaced passages of unequal length for conveying fluid longitudinally of said shaft, the inner ends of the longer passages extending through said sleeves to the opposite sides of said series of impeller chambers whereby one of said passages is connected to a high pressure stage of said pump and the other of said passages is connected to a low pressure stage of said pump, annular channels in said sleeves interconnecting the outer ends of each set of passages, and means for connecting the inner ends of the shorter passages through said sleeve to a source of pressure intermediate that of the high pressure stage and the low pressure stage of said pump.

2. A centrifugal pump comprising, in combination, a casing shaped to form a series of impeller chambers, a shaft journalled in said casing and extending through said chambers, a packing engaging said shaft at each end of said series of impeller chambers, a sleeve member overlying said shaft in the region of each packing, each sleeve including two spaced longitudinal ears engaging said shaft, a cylindrical portion spaced from said shaft defining a pair of longitudinal passages between said sleeve and said shaft, an annular channel in said sleeve interconnecting one end of said passages, and a pair of ducts in said sleeve communicating with the respective other ends of said passages, means connecting one of said ducts to a high pressure stage of said pump, and means connecting the other duct to a low pressure stage of said pump.

3. A centrifugal pump comprising, in combination, a casing shaped to form a series of impeller chambers, a shaft journalled in said casing and extending through said chambers for driving the impellers therein, packings engaging said shaft at the respective opposite ends of said series of impeller chambers, a sleeve at each end of the shaft, each sleeve having two spaced longitudinal ears engaging said shaft in the region of said packing, and a cylindrical portion spaced from said shaft, thereby defining a pair of longitudinal passages between said sleeve and said shaft, an annular channel interconnecting one end of each set of passages, a set of ducts in each sleeve communicating with the other ends of said passages, the ducts of one set being connected to a conduit and to a high pressure stage of said pump, respectively, the ducts of the other set being connected to a second conduit and to a low pressure stage of said pump, respectively, a valve connecting the first conduit and an intermediate high pressure stage of said pump, a valve connecting the second conduit and an intermediate low pressure stage of said pump, and a valve interconnecting said conduits.

4. A heat exchange assembly for a centrifugal pump comprising, in combination, a shaft, a sleeve having two spaced longitudinally extending ears secured to said shaft, a portion spaced from said shaft defining, with said ears, two longitudinal passages of generally semi-annular cross section, said passages being of unequal length, an annular channel in said sleeve interconnecting one end of said passages, and an enlarged arcuate portion formed in said sleeve at the other end of each of said passages, said arcuate portions communicating with openings formed in said sleeve to allow passage of fluid into and out of said passages.

5. A heat exchange assembly for a centrifugal pump comprising, in combination, a shaft adapted to carry a plurality of centrifugal pump impellers, said shaft having an axial bore formed therein, and a radial passage for admitting fluid from an impeller chamber to said bore, a sleeve mounted at each end of the impeller-carrying portion of said shaft, each of said sleeves having a pair of longitudinal spaced ears engaging said shaft and defining therewith a pair of diametrically opposite passages of generally semi-annular cross section, said passages being of unequal length, an annular channel interconnecting the outer end of each pair of passages, ducts connecting the inner end of the shorter passages to said bore, and ducts for connecting the inner end of the longer passages to the exterior of said sleeve.

6. A heat exchange assembly for a centrifugal pump comprising, in combination, a shaft adapted to carry a series of centrifugal pump impellers, said shaft having two sets of helical threads formed on the outer surface thereof, a sleeve surrounding and engaging the threaded portion of said shaft so that the two sets of threads define two discrete channels extending helically of said shaft, means for establishing communication between said channels at one end thereof, and means for establishing communication between the other ends of said channels and the exterior of said sleeve whereby liquid forced into one of said channels travels in a helical path to the opposite end of said channel and thence returns through the other helical channel.

7. A centrifugal pump comprising, in combination, a casing having a series of impeller chambers formed therein, an impeller in each chamber, a shaft journalled in said casing and extending through each of said chambers to drive said impellers, said casing being constructed and arranged to accommodate a packing for said shaft at each end of the impeller chambers, a sleeve fixed to said shaft and extending through each of said packings, a pair of spaced annular members concentric with said shaft for compressing said packing, an opening in one of said members communicating with a high pressure stage of said pump, two sets of helical threads formed on said shaft and defining separate helical channels which are interconnected at one end and have separate terminal regions at their other end, said sleeve having a passage formed therein connecting one of said terminal regions to the opening in said member, and means connecting the other terminal region to one of said impeller chambers.

8. A centrifugal pump comprising, in combination, a casing having a series of impeller chambers formed therein, an impeller in each chamber, a shaft journalled in said casing and extending through each of said chambers to drive said impellers, said casing being constructed and arranged to accommodate a packing for said shaft at each end of the impeller chambers, a sleeve fixed to said shaft and extending through said packing, a pair of spaced annular members concentric with said shaft for compressing said packing, the inner one of said members being keyed to said casing and having an opening formed therein communicating with a high pressure stage of said pump, the inner region of said chamber adjacent said member communicating with a low pressure stage of said pump, two sets of helical threads formed on said shaft and defining separate helical channels which are interconnected at their outer ends and have separate terminal regions at their inner ends, said sleeve having a passage formed therein connecting one of said terminal regions to the opening in said member, the other terminal region communicating with the pressure stage of said pump through said inner region.

9. A centrifugal pump comprising, in combination, a casing having a series of volute chambers formed therein, an impeller in each chamber, a shaft journalled in said casing and extending through each of said chambers to drive said impellers, said casing being constructed and arranged to accommodate a packing for said shaft at each end of the impeller chambers, a pair of sleeve members fixed to said shaft and extending through the respective packings to opposite sides of said series of impeller chambers, means cooperating with each sleeve and the shaft to define a pair of spaced passages of unequal length for conveying fluid lengthwise of the region between said shaft and each sleeve, the inner ends of the longer passages extending through said sleeves to the opposite sides of said series of impeller chambers whereby one of said passages is connected to a high pressure stage of said pump and the other of said passages is connected to a low pressure stage of said pump, annular channels in said sleeves interconnecting the outer ends of each set of passages, and means for connecting the inner ends of the shorter passages through said sleeve to one of said chambers so as to maintain a pressure drop between the inner end of each longer passage and the inner end of each associated shorter passage.

GERALD P. JENNINGS.
LEONARD P. MEADE.

REFERENCES CITED

The following references are of record in the file of this patent:

UNITED STATES PATENTS

| Number | Name | Date |
| --- | --- | --- |
| 879,484 | Morterud | Feb. 18, 1908 |
| 1,683,633 | Tait | Sept. 11, 1928 |

FOREIGN PATENTS

| Number | Country | Date |
| --- | --- | --- |
| 475,253 | Germany | Apr. 22, 1929 |